(No Model.) 4 Sheets—Sheet 1.

J. A. TRAUT & E. A. SCHADE.
BENCH PLANE.

No. 532,842. Patented Jan. 22, 1895.

Witnesses:
J. L. Edwards Jr.
Fred. J. Dole.

Inventors:
Justus A. Traut.
Edmund A. Schade.
By their Attorney,
F. H. Richards.

(No Model.) 4 Sheets—Sheet 2.

J. A. TRAUT & E. A. SCHADE.
BENCH PLANE.

No. 532,842. Patented Jan. 22, 1895.

Witnesses:
J. L. Edwards Jr.
Fred. J. Dole.

Inventors:
Justus A. Traut,
Edmund A. Schade.
By their Attorney
F. H. Richards (No Model.) 4 Sheets—Sheet 3.

J. A. TRAUT & E. A. SCHADE.
BENCH PLANE.

No. 532,842. Patented Jan. 22, 1895.

Witnesses:
J. L. Edwards Jr.
Fred. J. Dole.

Inventors:
Justus A. Traut,
Edmund A. Schade.
By their Attorney,
F. H. Richards.

THE NORRIS PETERS CO., PHOTO-LITHO., WASHINGTON, D. C.

(No Model.) 4 Sheets—Sheet 4.

J. A. TRAUT & E. A. SCHADE.
BENCH PLANE.

No. 532,842. Patented Jan. 22, 1895.

Witnesses:
J. L. Edwards Jr.
Fred. J. Dole.

Inventors:
Justus A. Traut,
Edmund A. Schade.
By their Attorney,
F. H. Richards

THE NORRIS PETERS CO., PHOTO-LITHO., WASHINGTON, D. C.

UNITED STATES PATENT OFFICE.

JUSTUS A. TRAUT AND EDMUND A. SCHADE, OF NEW BRITAIN, CONNECTICUT.

BENCH-PLANE.

SPECIFICATION forming part of Letters Patent No. 532,842, dated January 22, 1895.

Application filed June 20, 1894. Serial No. 515,114. (No model.)

*To all whom it may concern:*

Be it known that we, JUSTUS A. TRAUT and EDMUND A. SCHADE, citizens of the United States, residing at New Britain, in the county of Hartford and State of Connecticut, have invented certain new and useful Improvements in Bench-Planes, of which the following is a specification.

This invention relates to that class of bench-planes known as "molding-planes;" the object being to provide an improved plane of that class adapted for doing work of a wide range both in form and size, also means for adjusting the different parts of the plane in all directions, in accordance with the work to be done, while maintaining the simplicity, compactness of construction, and readiness of adjustment and manipulation necessary to a practically operative tool of such comprehensive character.

Our present invention is in the nature of an improvement upon the inventions shown in Letters Patent No. 294,825, granted to Justus A. Traut March 11, 1884, and No. 505,119, granted to Eppie J. McCulloch September 19, 1893.

In the drawings accompanying and forming a part of this specification, Fig. 5 is a similar view of the parts below said line. Fig. 6 is a transverse section in line $b$—$b$, Fig. 5. Fig. 7 is an elevation detail of the auxiliary runner hereinafter referred to. Fig. 8 is a similar view of an intermediate runner or gage, also hereinafter referred to.

Similar characters designate like parts in all the figures.

According to our present improvements the body-portion of the plane comprises a main stock A, provided with transversely-arranged rods or pins B and C, upon which an auxiliary stock, designated in a general way by D, is adjustable toward or from the main-stock in lateral direction. The rods or pins also support the end gages E and F, which are adapted to be similarly adjusted in lateral direction, to regulate the distance of the cut from the edge of the piece of board or other material to be operated upon. The usual handle, 72, is provided upon the main stock for actuating the plane, and handles, 73 and 74, are secured to the edge-gages in a manner which will be hereinafter more fully described.

The main-stock has secured thereto, by means of rivets or otherwise, the usual steel blade or runner 75; and an adjustable blade or runner, 2, is mounted upon the auxiliary stock D. In order to provide a clear space at the throat of the plane for the shavings to pass out, the front and rear portions of this adjustable runner 2 are permanently connected, preferably by means of a lateral arch or brace, 3, as shown in detail in Fig. 7. The end portions of the auxiliary stock are also connected and supported in a similar manner by means of a second lateral arch or half-ring brace, 4.

The rods or pins B and C are, preferably, each made of a single piece, and are held securely in place in the sockets, 5 and 6, of the main-stock A, by means of binding-screws, 7 and 7', which admit of lateral adjustment of the rods when the character of the work requires it.

Figures 5, 6, 7, 8:
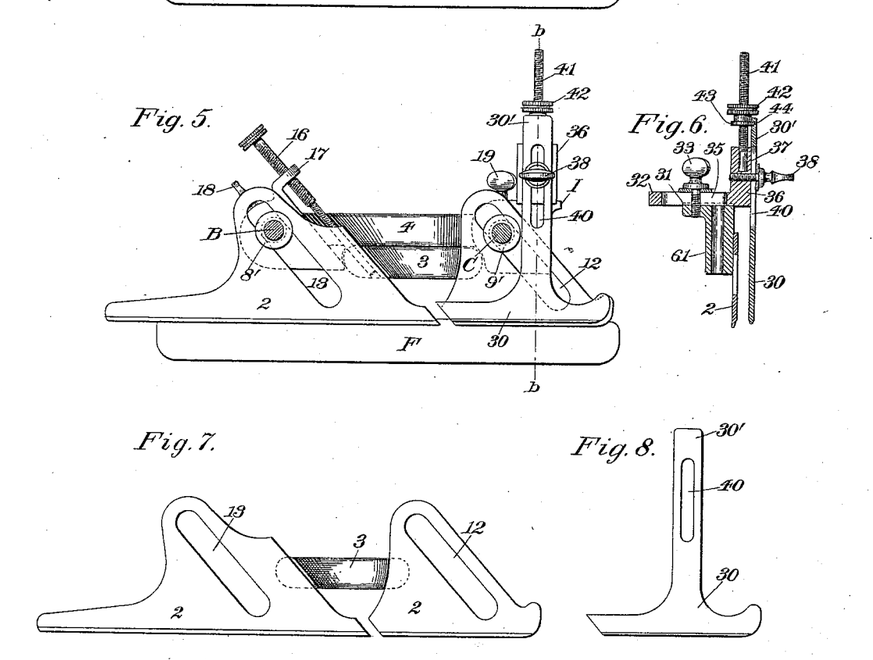
Figures 9, 10, 11, 12, 13, 14, 15, 16:
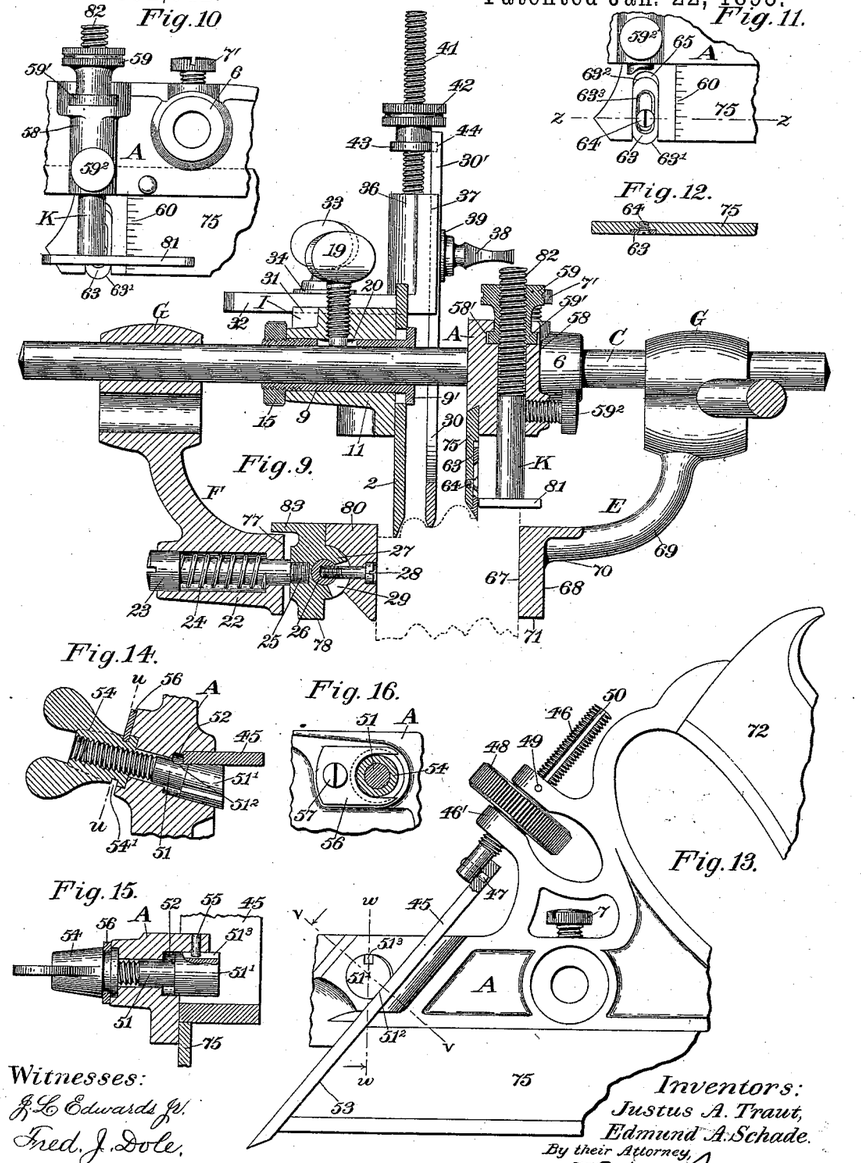
Fig. 9 is a transverse sectional end elevation in line $y$—$y$, Fig. 1.
Fig. 10 is a detail in side elevation, taken from the right, of an adjustable stop or gage, and adjacent parts, to be hereinafter described.
Fig. 11 is a similar view of one of the spurs.
Fig. 12 is a longitudinal section in line $z$—$z$, Fig. 11.
Fig. 13 is a detail sectional side elevation of a cutter, its clamping and adjusting devices and adjacent parts.
Fig. 14 is a sectional detail in line $v$—$v$, Fig. 13.
Fig. 15 is a similar view in line $w$—$w$, Fig. 13.
Fig. 16 is a sectional detail in line $u$—$u$, Fig. 14.

As clearly shown in Fig. 9, the auxiliary stock D is provided with sleeves, 8 and 9, within which the rods B and C are journaled, and upon which rods said sleeves, and the connected parts of the auxiliary stock, have a free, sliding, lateral movement. Each of said sleeves is secured within one of the corresponding sockets, 10 and 11, of the auxiliary stock, and said sockets are usually formed integral with the stock itself and its supporting arch 4. The runner 2, the form thereof shown in Fig. 7, is provided with oblique slots, 12 and 13, and said runner is adjusted upon the stock by the play of said slots upon the sleeves 8 and 9. The adjustable runner is held in place laterally by means of flanges, 8' and 9', upon the inner ends of the corresponding sleeves. Milled nuts, 14 and 15, are provided upon the outer screw-threaded ends of the sleeves 8 and 9, to hold said sleeves in place, and also for the purpose of obtaining a secure lateral hold upon the runner 2, by means of the flanges 8' and 9', and thereby preventing shifting of said runner in lateral direction. The vertical adjustment of the runner 2 is obtained by means of a long screw-rod, 16, preferably provided with right-and left-hand threads of different pitch, to prevent slipping of the screw. The upper end of the screw passes through the threaded shoulder 17, which is cast integral with the body-portion of the auxiliary stock, while the lower end or point of said screw works within a screw-threaded aperture (shown in dotted lines in Fig. 5) in the arch or brace, 3, connecting the front and rear portions of the runner 2. When said screw 16 is turned to the right,—that is, in the usual direction,—the runner will, through its slots 12 and 13, ride down upon the sleeves 8 and 9; and conversely, when said screw is turned to the left, the said runner will in the same manner ride up said sleeves. The difference in pitch and direction of the threads upon said screw prevents the slipping of said runner when adjusted to position without further locking; but when desired, the milled nuts 14 and 15 may be turned still farther, to bind the runner firmly in its adjusted position. Binding-screws, 18 and 19, pass through correspondingly-threaded apertures in the sockets 10 and 11, and through longitudinal slots 20 in the sleeves 8 and 9, and impinge and bind against the rods B and C, thus securing the auxiliary stock, with its connected parts, firmly in place upon said rods and in fixed relation laterally to the main-stock A.

Figure 2:
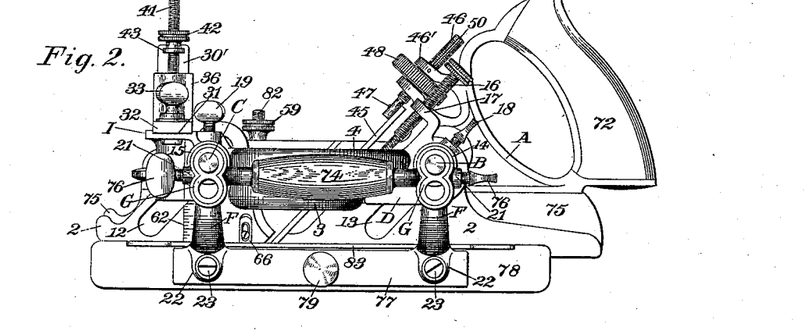
Fig. 2 is a side elevation thereof.

Each of the side or edge gages, E and F, is provided with a double sleeve or socket for each of the rods B and C, said sockets being designated in a general way by G. As shown in Fig. 2, said sleeves are formed integral with the body of the gage, are superposed, and are provided with a common binding-screw, 76. This binding-screw works in a threaded aperture, 21, placed transversely and at the median line of the apertures in the sleeves. The points of said screw 76 are beveled, and thus the screws are adapted to bind against the rods B and C, whether said rods are placed in the upper or the lower sleeve-openings, in the manner described in the patents hereinbefore referred to.

For rough work and for work where the plane is set level, the gage E, shown at the right of Fig. 9, is sufficient; but for fine work requiring delicate adjustments of the gage, or an oblique position of the plane with respect to the work, or both, we make use of the adjustable gage F, clearly shown at the left of said Fig. 9. Here the main or fixed rail 77 is provided with the integral sockets 22, two or more in number, and within each of these sockets is a bolt, 23, surrounded by a coiled spring, 24, spanning the space between the inner side of the head of the bolt and the end-wall of the socket, which, as shown, merges into the rail 77. The inner end of said bolt is screw-threaded at 25, as shown, and is set within a correspondingly-threaded aperture in the face of an auxiliary rail 78. The movable rail 78 is adjusted with respect to the main rail 77 by the turning of the adjusting-screw 79 to the right or left, the force of the spring 24 serving to prevent movement of the parts after the adjustment of the movable rail is made. A simple movable rail with a flat edge or face is sufficient so far as delicacy of adjustment of the gage is concerned; but for tilting the plane to an oblique position, it is necessary that a two-part adjustable rail be provided, the bearing-face of which may oscillate about an axis in the non-oscillatory member thereof.

In Fig. 9, 78 is shown as having a semi-circular rib or tongue upon its inner face, and is provided also with an axially-disposed rod or spindle, 26. The oscillatory rail 80 is concaved to conform to the outline of the rib 27 upon the rail 78; and a screw, 28, passing through the rail 80 and countersunk therein, also passes through a peripheral slot 29 in the rib 27 and is engaged at its point by a threaded recess in the spindle 26. It will, of course, be understood that at least two such connections of the parts 78 and 80 must be made. When the rail 80 is to be adjusted, the set-screw 28 is loosened slightly, and said rail oscillated upon the axis 26 until it is in the proper position, when it is locked there by tightening the screw. By means of this two-part adjustable gage or rail, the plane may be set to any desired slant to conform to the character of the work to be done.

Upon a post on the forward end of the auxiliary stock D, said post being designated in a general way by I, is adjustably mounted a third or intermediate blade or runner 30. The mounting of said runner will now be described, as this feature is one of the essential points of this invention. Working within a transverse guide-way, the lower wall of which is shown at 31, in Figs. 2, 6 and 9, is a laterally-movable slide, 32, that is adapted to be locked in position, when adjusted, by means of a binding-screw 33 and washer 34; the body of the screw working in a guide-slot, 35, traversing said slide longitudinally for the greater portion of its length. From the inner end of said slide rises a post or bracket, designated in a general way by 36, and the inner face of said post is provided with a vertical guideway, the inner wall of which is shown at 37, in Figs. 6 and 9. The vertical arm 30' of the intermediate runner 30 is adapted for vertical movement in said guide-way, and is locked, when set in position, by means of a binding-screw and washer, 38 and 39, in the manner just before described, the body of the screw working in the slot or guide 40 in the vertical arm of the runner 30. A fine adjustment of said runner in a vertical direction is secured in the following manner: The post 36 is provided with a vertically-threaded bore parallel with the arm 35 of the intermediate runner, and within this bore is set a threaded rod or spindle, 41. A nut, 42, is adapted to ride up and down the thread of said rod, and carries with it a flange, 43, working in a corresponding slot or recess, 44, in the outer face of the vertical portion of the intermediate runner 30, whereby said intermediate runner is adjusted in vertical direction as desired. When so adjusted, the runner is locked in position in the manner just described. It will be seen that we thus provide both a vertical and a lateral adjustment for this runner, and that these adjustments can be as readily effected as the adjustments of the runner 2 upon the auxiliary stock. These adjustments, moreover, are entirely independent of the adjustments of the auxiliary runner 2, as the adjusting-slides and guide-ways are mounted upon a fixed portion of the toe of the auxiliary stock.

Figure 18:
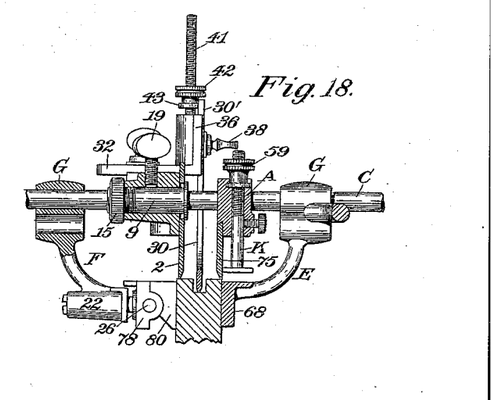
Figure 20:
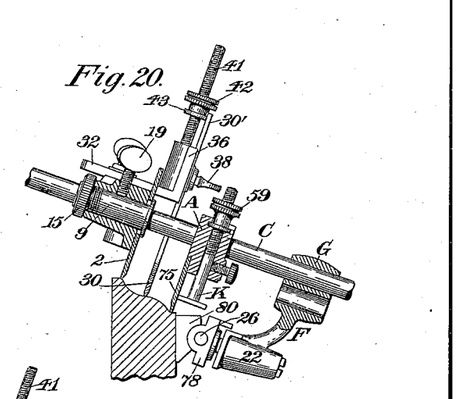
Figure 21:
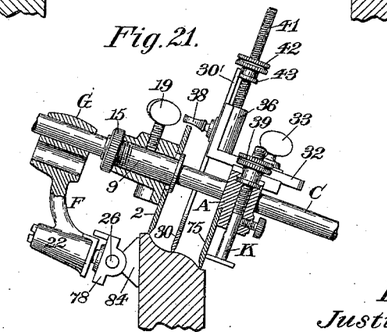
Fig. 21 is a similar view of a modification to be hereinafter described.

While both of the movable runners are adjusted vertically and laterally, independently of each other, and while each is also independently adjustable, vertically and laterally, of the fixed runner on the main stock A, there is a certain dependency of adjustment of the movable runners, due, however, solely to the inclination of the plane, when at work in a position similar to those shown in Figs. 18, 20 and 21.

For the purposes of our present invention, it is immaterial whether the intermediate runner and its adjusting-means are placed upon the auxiliary stock or upon the main stock, as the intermediate gage would be actuated and controlled in the same manner and perform the same functions in both cases. In Fig. 21 we have shown the said runner, with its adjusting-slides, guides, and adjusting- and clamping-screws, mounted upon the main stock, A, of the plane.

Referring now particularly to Figs. 13 to 16, inclusive, the adjusting- and clamping-devices for the cutter, or plane iron, will now be described.

Figure 1:
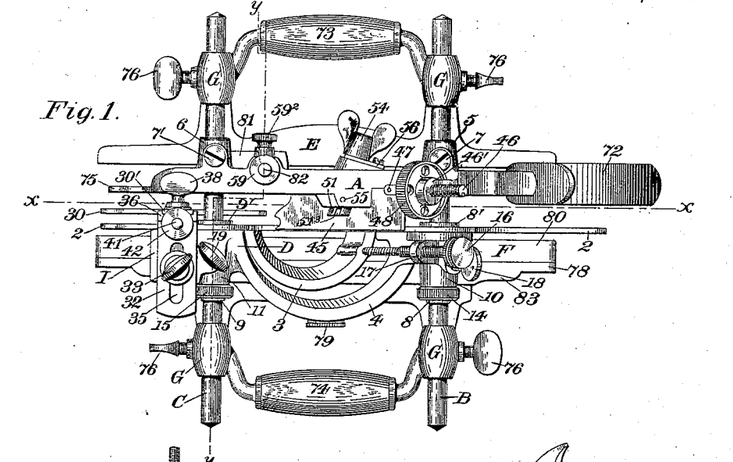
Figure 1 is a plan view of a bench-plane embodying our present improvements.

45 designates the cutter, which is secured to the adjusting-screw 46 by means of a pin-and-slot connection 47, said screw working in registering threaded apertures in the bracket 46' and being controlled, in the usual manner, by means of a hand-wheel 48. As will be seen from Fig. 1, the slot in the cutter is upon the extreme outer edge, in line with the edge-wall of the cutter-slot, to adapt the plane for use with wide or narrow irons. Rotation of the adjusting-screw is prevented by means of a pin, 49, working in the longitudinal slot or groove 50 in said screw. When the cutter has been adjusted to the proper depth, it is clamped in position by means of a clamping wedge-bolt, designated in a general way by 51, and working in an aperture or bore, 52, extending entirely through the main stock transversely but in a slightly oblique direction. The head 51' of this bolt is beveled off to conform with the inner side of the main stock, and the lower face thereof, which binds against the upper side of the cutter 45, is filed off obliquely, as shown at $51^2$, to form a wedge adapted to be crowded against the said face of the cutter and clamp the cutter against the rear wall 53 of the cutter-slot. As will be seen, the action of this clamping-bolt is such that when it is drawn into its bore 52 by the rotation in the corresponding direction of the nut 54, it will wedge against and clamp the cutter in place; while when it is forced out of the said bore by the turning of the nut in the opposite direction, it rises away from and unlocks the cutter. This wedging action, as will be seen, admits of the clamping in position of very wide or very narrow cutters as well as very thick or very thin cutters. In the upper face of the head 51' of the clamping-bolt, is a slot, $51^3$, co-operating with a pin, 55, passed through the upper wall of the main stock downwardly into the bore 52. This pin-and-slot connection prevents rotation of the clamping-bolt when actuated by the turning of the nut 54, so that only a reciprocatory movement will be imparted to the bolt by the nut. The nut 54 is provided with a circumferential groove or slot, 54', and is held in place against the outer wall of the main stock, and just within the entrance to the bore 52, by means of a holding-plate, 56, surrounding the narrow portion of the nut at said slot or groove and held to the main stock by means of a set-screw 57. The nut is thus free to turn without danger of falling out of the bore 52.

Directly in front of the clamping-device for the cutter, and upon the outer side of the main stock near the toe thereof, is a depth-gage, or stop, designated in a general way by K, and clearly shown in Figs. 9 and 10. As shown, this gage consists of a face-plate, 81, having a perpendicular adjusting rod or post screw-threaded at 82. This adjusting-rod or bolt works in the vertical bore of a socket, 58, integral with the main stock of the plane, and is raised or lowered by means of a flanged nut, 59, the flange 59' of which works in a transverse slot or groove, 58', in said socket, the construction being similar to that of the nut 42 for adjusting the intermediate gage or runner 30. A clamp-nut, $59^2$, holds the screw-post in place when adjusted. A scale, 60, is provided upon the main runner, for convenience of adjustment of the depth-gage.

Figure 3:
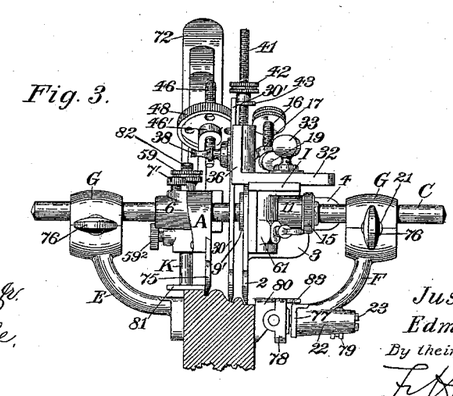
Fig. 3 is a front elevation of the same.
Figure 4:
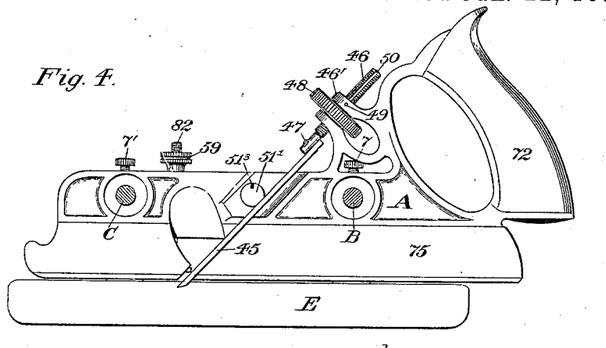
Fig. 4 is a longitudinal sectional side elevation, in line $x$—$x$, Fig. 1, of the parts above said line.

Both the depth-gage and its scale may be duplicated upon the outer side of the auxiliary runner, if desired, the socket for the gage being shown at 61 in Fig. 3, and the scale at 62 in Fig. 2.

When using the cutter or plane-iron as a plow, we throw into operation a spur, 63, rectangular in its general outline, but having rounded spur-points, 63' and 63². A longitudinal slot, 63³, with sloping or beveled walls, extends through the body of the spur and forms a guide-way for a conical-headed set-screw, 64. This spur is set into a vertical recess, 65, in the runner of the main stock, (see Fig. 11,) and the spur is held in place within said recess by the expansion of its side-walls by the screw 64 when said screw is forced home within its seat,—the threaded aperture that extends through the main-stock runner transversely, as shown in Fig. 12. A second spur, 66, (as shown in Fig. 2,) is secured to the outer side of the auxiliary runner 2. This arrangement forms a very effective means for locking the spur firmly in place, and is very simple in construction. Either one of the two points of the spur may be brought into operation by removing and re-setting the screw 64, and the spur locked in position against the walls of the runner by the expansion of the thin sides thereof by the screw.

The side-gages or fences are interchangeable and may be used upon either side of the body of the plane. Moreover, the plane-gage E may not only be used upon either side of the stock, but it may also be reversed so that the handle will be nearest the body of the plane, and the rail or face-plate farthest therefrom. This arrangement of the gage is intended particularly for center-beading wide material, for which a very long reach is necessary. This gage, therefore, has its rail or face-plate ground with parallel sides, 67 and 68, so that the work may be held properly whichever side may be in use. The under sides of the arms, 69, of the gage E are also ground at the points 70 to a plane parallel with the plane of the sole 71 of the rail or face-plate. These upper stops thus form a guide or bearing-face on which to run the plane when used upon wide material for center-beading, &c. The bearings, G, of the side-gages are connected by the handles 73 and 74, in such a manner that they are brought into the proper position for holding the plane with the hand which is not used for grasping the main handle 72. By means of the two side-edges, the material to be operated upon may be held firmly between the two face-plates or rails, so as to steady the plane laterally, and thus, in connection with the runners upon the main and auxiliary stocks, hold the plane to its course. We consider this as of importance, especially when a workman has to use the plane continuously for a considerable period of time. Another advantage arising from the use of two side-gages is that one of them may be set lower than the other, the rods B and C being put through the upper of the bearings G in one gage and through the lower bearings in the other gage, according to the character of the molding to be produced by the workman. When the side-gage is carried by the rods in the upper bearings thereof, the face-plate or rail of the gage will usually extend below the cutter, so that, if desired, only a portion of the full width of the cutter may be used. Under some circumstances, the said rail may also extend below the cutter when carried by the rods in its lower bearings. The adjustable rail of the gage F is, preferably, provided with an overhanging flange, 83, in order to prevent the choking of the space between the adjustable rail and the main body by the falling of chips and shavings therein.

Figure 17:
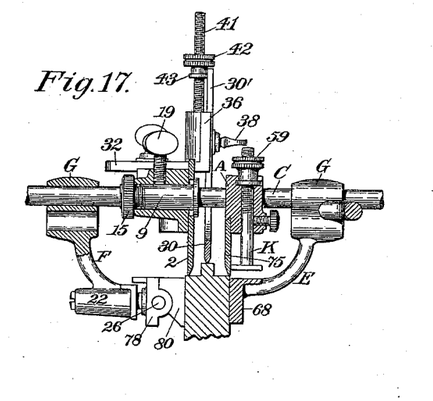
Figs. 17 to 20, inclusive, are sectional rear elevations, showing various adjustments of the tool for different kinds of work.

In Figs. 17 to 21, inclusive, we have illustrated a number of different arrangements or adjustments of the parts of our improved plane for different kinds of work. In Fig. 17 is shown the adjustment for making a tongue. Here the intermediate runner or gage 30 is set for the depth of the tongue, with the main and auxiliary runners at the same level, the side-gages being adjusted to engage the faces of the board. The corresponding groove in the opposite piece of material is made by substituting a proper grooving-cutter for the deep-slotted cutter used for forming the tongue, the position of the intermediate runner being correspondingly altered.

Figure 19:
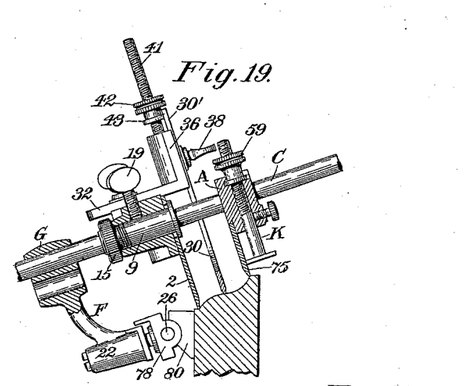

Figs. 19 and 20 illustrate different adjustments of the runners for plain molding from opposite sides of the piece of material. Fig. 21 illustrates a somewhat different adjustment of the runners to that shown in Fig. 20; but here the intermediate runner is mounted upon the main stock of the plane, and the adjustable side gage disposed at the opposite side of the work.

A further modification of the adjustable rail of the side gage F is here shown, at 84, as permitting both upward and downward tilting of the gage, whereby additional adjustability is provided therefor.

We consider as of especial importance the addition to a bench-plane having an auxiliary runner, vertically and laterally adjustable, of a third runner intermediate of the main and auxiliary runners, as by the use of such third runner a central and more perfect bearing-surface is secured for the plane, and the work of the cutter more perfectly and thoroughly accomplished, especially in beading, center-beading, and grooving or rabbeting.

All of the runners are relatively thin and adapted to lie substantially contiguous to one another, so that they will track in correspondingly-narrow and relatively-adjacent grooves or channels in the work, as in forming narrow beads close together upon the material.

As the control of the adjustments of the intermediate gage is entirely independent of the adjustments of the auxiliary runner, readiness of manipulation is assured, and both hands of the workman may be used to simultaneously set the two adjustable runners to the positions desired. As before stated, it is immaterial whether this third gage be mounted upon the main or the auxiliary stock, as the adjustments can be as readily made from the one part of the tool as from the other. It will be observed that a very fine adjustment of this gage is obtained by means of the nut 42 riding upon the spindle 41, and carrying with it the runner. A substantially similar fine adjustment of the depth-gage or-gages is also provided, which insures greater accuracy and precision in the laying out of the work to be done. The same may be said of the adjustment of the auxiliary gage or runner by means of its threaded bolt or spindle working in the fixed bracket or shoulder of the auxiliary stock; and a very stiff support is formed by this construction in connection with the clamping-sleeves and nuts upon the supporting-rods for the side-gages of the auxiliary stock. This clamping-sleeve and nut, in connection with the thumb-screws passing through the bore of the bearing of the auxiliary stock and through the slot in the sleeve, form a very secure and rigid clamping-means for holding the stock to said rod and the auxiliary runner to the inner face of the stop by means of the flanged inner end of the sleeve; as by means of the nut upon the outer end of said sleeve the gripping effect of said flange may be increased or diminished at will, to accord with the work being done.

The adjustment and locking of the cutter or plane-iron may be also very perfectly controlled by the setting of the cutter by means of the screw-post or spindle and hand-wheel, and the locking of the clamping wedge-bolt set at an angle sufficient to compensate for variations in thickness of different cutters. By means of the pin-and-slot connection, a very narrow cutter can be as perfectly set and clamped in place as a very wide one. Moreover, the adjusting-nut for said clamping-bolt is at all times in position for use, and cannot possibly be displaced or lost without removing its locking-plate.

By means of the side-gages, an approximate adjustment thereof upon the rods B and C may be obtained, and said gages then locked in position by the usual clamp-screws. A subsequent fine adjustment of the gage having the adjustable rail or face-plate is then effected by the turning of the adjusting-screw 79, which forces said adjustable rail away from the main fixed rail in opposition to the action of the springs. Various modifications of this adjustable gage may be made, so long as the principle thereof—viz: normally holding said parts together by spring-pressure, and gradually separating them to regulate the distance of the adjustable rail from the fixed rail—is adhered to. As the two side-gages are interchangeable, it will be readily seen that our improved plane can be quickly and easily adjusted to any position for any kind of work, and that mutual adjustability of parts is not confined to the movable runners alone, but is also present in the gages as well. In addition to this, the position of the fixed gage can be reversed at either side of the stock, so as to accommodate material of either narrow or broad widths, a feature of special importance in center-beading upon wide material. The additional vertical adjustments of the gages rendered possible by inserting the rods in either the upper or the lower bearings are also of importance in using a cutter having its cutting-point considerably in advance of its cutting-heel, as one of the gages can then rest in its upper bearings while the other rests in the corresponding lower bearings. It also enables the workman to use either the full width of his cutter or only a portion thereof. The reversibility of the fixed gage is also a very useful characteristic when operating upon wide pieces, as the under sides of the connecting arms joining the fixed rail and the bearings of said gage, being in a plane parallel with the sole of the gage, rest upon the upper edge of the work and practically form a depth-gage therefor, thus steadying the plane, when working upon wide material, in a very perfect manner; and in connection with the outer face of the gage-rail, which is then in contact with the side of the material, a guide is formed which is as accurately adjusted with respect to the work as when the gage is in its usual position. The very long reach obtained by this reversal is, as before stated, especially useful for center-beading work.

The connection of the bearings of the auxiliary stock, and of the toe and heel portions of the auxiliary runner, by means of stiff arches or half-ring braces, forming between them one side of the plane-throat and affording ample clearance for the shavings and chips thrown out by the cutter, is a structural detail which we have found to be of very material importance in actual practice.

The clamping-device for the cutter or plow-iron is not essentially different from those now in use, except that it is placed obliquely to the cutter and the wedge corresponding in shape. By this means we obtain a much firmer hold upon the iron, and the cutter is, moreover, much more readily clamped and unlocked.

Having thus described our invention, we claim—

1. In a bench-plane, the combination with the main stock and its runner, of an adjustable auxiliary stock and runner, an independently-adjustable runner intermediate of said main and auxiliary stocks and carried by one of said stocks and adapted to form a central bearing-face for the plane, and means for positively maintaining said last-mentioned runner in its several positions independently of said first-mentioned runner, all of the runners being relatively thin and adapted to lie substantially contiguous to one another whereby said runners will track in correspondingly-narrow and relatively-adjacent grooves or channels in the work, substantially as described.

2. In a bench-plane, the combination with the main-stock and its runner, of an auxiliary stock laterally adjustable with respect to the main stock, an auxiliary runner mounted upon said auxiliary stock and vertically adjustable thereon, a runner having independent vertical and lateral adjustments with respect to the main and auxiliary runners and carried by one of said stocks and adapted to form a central bearing-face for the plane, and means for positively maintaining said last-mentioned runner in its several positions independently of said first-mentioned runners, all of the runners being relatively thin and adapted to lie substantially contiguous to one another whereby said runners will track in correspondingly-narrow and relatively adjacent grooves or channels in the work, substantially as described.

3. In a bench-plane, the combination with the main stock and its runner, of an auxiliary stock laterally adjustable with respect to the main stock, an auxiliary runner mounted upon said auxiliary stock and vertically adjustable thereon, a third runner also mounted upon the auxiliary stock and adjustable thereon independently of the auxiliary runner and adapted to form a central bearing-face for the plane, and means for positively maintaining said third runner in its several positions independently of the first-mentioned runners, all of the runners being relatively thin and adapted to lie substantially contiguous to one another whereby said runners will track in correspondingly-narrow and relatively-adjacent grooves or channels in the work, substantially as described.

4. In a bench-plane, the combination with the main stock and its runner, of an auxiliary stock laterally adjustable with respect to the main stock, an auxiliary runner mounted upon said auxiliary stock and vertically adjustable thereon, and a third runner also mounted upon the auxiliary stock and vertically and laterally adjustable thereon independently of the auxiliary runner and adapted to form a central bearing-face for the plane, and means for positively maintaining said third runner in its several positions independently of the first-mentioned runners, all of the runners being relatively thin and adapted to lie substantially contiguous to one another whereby said runners will track in correspondingly-narrow and relatively-adjacent grooves or channels in the work, substantially as described.

5. In a bench-plane, the combination with the main and auxiliary stocks and runners, of a third runner intermediate of the main and auxiliary runners and carried by one of said stocks and adapted to form a central bearing-face for the plane, a vertical adjusting-arm or slide for said third runner, a laterally-adjustable guide fixed against vertical movement with respect to the main and auxiliary runners, a clamping device for said lateral guide, a threaded spindle upon said guide, a nut traveling upon the spindle and carrying with it the vertical arm of the runner, and a clamping-device for said arm, and adapted to lock said third runner in its vertically-adjusted position, all of the runners being relatively thin and adapted to lie substantially contiguous to one another whereby said runners will track in correspondingly-narrow and relatively-adjacent grooves or channels in the work, substantially as described.

6. In a bench-plane, the combination with the main stock and its runner, of lateral rods extending from said main stock, an auxiliary stock mounted upon said rods and adjustable in lateral direction thereon, an auxiliary runner having oblique parallel guides adapted to engage said rods to positively maintain said runner in parallelism with the cutter or plane-iron, and an adjusting-screw working in a bore in the auxiliary stock in parallelism with said oblique guides and controlling the vertical adjustment of the auxiliary runner and adapted to transmit the force of said runner to the auxiliary stock in a line parallel with said guides, whereby said auxiliary stock forms a positive stop for said runner longitudinally of the adjusting-screw and maintains said runner securely in its adjusted position, substantially as described.

7. In a bench-plane, the combination with the main stock and its runner, of lateral rods extending from said main stock, an auxiliary stock mounted upon said rods and adjustable in lateral direction thereon, an auxiliary runner having oblique parallel guides adapted to engage said rods and to positively maintain said runner in parallelism with the cutter or plane-iron, and a right-and-left-hand adjusting-screw working in a bore in the auxiliary stock in parallelism with said oblique guides and controlling the vertical adjustment of the auxiliary runner and adapted to transmit the force of said runner to the auxiliary stock in a line parallel with said guides, whereby said auxiliary stock forms a positive stop for said runner longitudinally of the adjusting-screw and maintains said runner securely in its adjusted position, substantially as described.

8. In a bench-plane, the combination with the main stock and runner, of lateral rods extending from said main stock, flanged sleeves mounted upon said rods and carried in bearings in the auxiliary stock, an auxiliary runner guided upon said rods obliquely parallel with the cutter or plane-iron and supported laterally between the flanges of said sleeves and the adjacent bearing-faces of the auxiliary stock, and an adjusting-screw mounted upon the auxiliary stock and controlling the vertical adjustment of the auxiliary runner and adapted to maintain said auxiliary runner in its adjusted position, substantially as described.

9. In a bench-plane, the combination with the main stock and runner, of lateral rods extending from the main stock, screw-threaded flanged sleeves mounted upon said rods and carried in bearings in the auxiliary stock, an auxiliary runner guided upon said rods obliquely parallel with the cutter or plane-iron, and supported laterally between the flanges of said sleeves and the adjacent bearing-faces of the auxiliary stock, adjusting-nuts upon said sleeves, and an adjusting-screw mounted upon the auxiliary stock and controlling the vertical adjustment of the auxiliary runner and adapted to maintain said auxiliary runner in its adjusted position, substantially as described.

10. In a bench-plane, the combination with the main stock, and lateral rods extending therefrom, of an auxiliary stock having bearings in line with said rods, laterally-adjustable flanged sleeves carried in said bearings and mounted upon said rods, the flanges of said sleeves adapted to carry between them and the adjacent bearing-faces of the auxiliary stock the auxiliary runner and thereby positively maintain said auxiliary runner against lateral movement, registering-apertures in the bearings and sleeves, and clamp-screws working in said apertures and adapted to lock the auxiliary stock to the rods, substantially as described.

11. In a bench-plane, the combination with the main stock and runner, and lateral rods extending from said main stock, of an auxiliary stock and runner, laterally-adjustable sleeves mounted upon said rods and carried in bearings in the auxiliary stock, and means carried by said sleeves forming with the auxiliary stock vertical guides adapted for directing the corresponding movements of the auxiliary runner and for positively locking said auxiliary runner against lateral displacement, substantially as described.

12. In a bench-plane, the combination with the main stock and runner, and lateral rods extending from said main stock, of an auxiliary stock and runner, laterally-adjustable sleeves mounted upon said rods and carried in bearings in the auxiliary stock, means upon said sleeves engaging the auxiliary runner, and means for clamping said sleeves and runner and forming with the auxiliary stock vertical guides adapted for directing the corresponding movements of the auxiliary runner and for positively locking said auxiliary runner against lateral displacement laterally in their adjusted positions, substantially as described.

13. In a bench-plane, the combination with the main stock and runner, and lateral rods extending from said main stock, of an auxiliary stock and runner, means for adjusting said runner vertically upon the auxiliary stock, and laterally-adjustable sleeves mounted upon said rods and carried in bearings in the auxiliary stock, said sleeves adapted to engage the auxiliary runner and form with the auxiliary stock vertical guides for directing the corresponding movements of the auxiliary runner and for positively clamping said auxiliary runner laterally in its adjusted position, substantially as described.

14. In a bench-plane, the combination with the main stock and runner, and lateral rods extending from said main stock, of an auxiliary stock and runner, laterally-adjustable sleeves mounted upon said rods and carried in bearings in the auxiliary stock, means upon said sleeves and co-operating with the face of the auxiliary stock adjacent to said sleeves for clamping the auxiliary runner laterally in its adjusted position, and means for simultaneously clamping the auxiliary stock and sleeves to the rods, substantially as described.

15. In a bench-plane, the combination with the main stock and runner, and lateral rods extending from said main stock, of the auxiliary stock and runner, laterally-adjustable sleeves mounted upon said rods and carried in bearings in the auxiliary stock, means upon said sleeves and co-operating with the face of the auxiliary stock adjacent to said sleeves for clamping the auxiliary runner laterally in its adjusted position, registering-apertures in the bearings and sleeves, and clamp-screws working in said apertures and adapted to lock the auxiliary stock and the sleeves to the rods, substantially as described.

16. In a bench-plane, the combination with the main stock and runner, lateral rods extending from said stock, and an auxiliary stock and runner mounted upon said rods, of gages also mounted upon said rods and upon each side of the body of the plane and adjustable toward and from the stock and adapted to engage the lateral faces of the work and to be positively held thereby against lateral movement relatively to the work when said gages are clamped to the rods, substantially as described.

17. In a bench-plane, the combination with the main stock and runner, and lateral rods extending from said main stock, of a laterally-adjustable side-gage mounted upon said rods and having an auxiliary member laterally and radially adjustable independently of the body of the gage and relatively thereto, and a resilient connection between said auxiliary member and the body of the gage and adapted to hold said members normally in engagement with each other, substantially as described.

18. In a bench-plane, the combination with the main stock and runner, and lateral rods extending from said stock, of a laterally-adjustable side-gage mounted upon said rods and having a two-part movable rail comprising an intermediate member laterally-adjustable independently of the body of the gage and in parallelism therewith, an oscillatory face-plate hinged to said intermediate member, and a locking-means for said two-part rail, substantially as described.

JUSTUS A. TRAUT.
EDMUND A. SCHADE.

Witnesses:
FRED. J. DOLE,
ROBT. U. RUDDELL.